P. AMSLER.
TRANSFORMATION OF DIRECT CURRENTS.
APPLICATION FILED MAR. 29, 1912.

1,046,934.

Patented Dec. 10, 1912.

Witnesses:
Ewd L. Tolson
C E Parsons

Inventor
Paul Amsler,
by Spear Middleton Donaldson Spear
Attorneys

UNITED STATES PATENT OFFICE.

PAUL AMSLER, OF BADEN, SWITZERLAND, ASSIGNOR TO AKTIENGESELLSCHAFT BROWN BOVERI & CIE., OF BADEN, SWITZERLAND.

TRANSFORMATION OF DIRECT CURRENTS.

1,046,934.  Specification of Letters Patent.  Patented Dec. 10, 1912.

Application filed March 29, 1912. Serial No. 687,215.

*To all whom it may concern:*

Be it known that I, PAUL AMSLER, engineer, a citizen of the Republic of France, and residing at Baden, Switzerland, have invented certain new and useful Improvements in and Relating to the Transformation of Direct Currents, of which the following is a specification.

This invention relates to the transformation of direct currents, particularly those of high tension.

With shunt excited direct current machines for high tension it is necessary to use field windings consisting of a large number of fine wire coils which have to be insulated for the high voltage, rendering the machines expensive and impairing their reliability.

The object of the present invention is to provide a transforming arrangement, particularly in connection with such machines which will render them free of the disadvantages referred to above.

The invention in brief consists in mechanically coupling together a motor and a dynamo and exciting the motor by means of a series high tension winding of substantially few turns an opposing series low tension winding and a low tension winding of a comparatively large number of turns assisting the first winding.

The invention also consists in providing a main excitation for a high tension motor from a source of low tension supply comprising a dynamo electric machine driven by the main motor, an additional winding being added so that starting can be effected solely by the high tension current.

The accompanying diagrams represent several examples of carrying the invention into effect.

Figure 1:
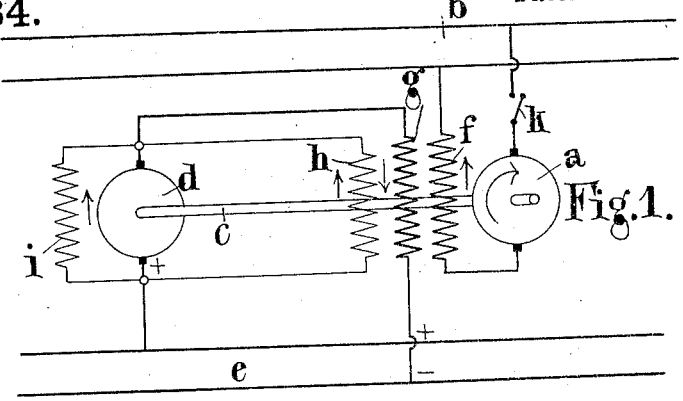
Figure 2:
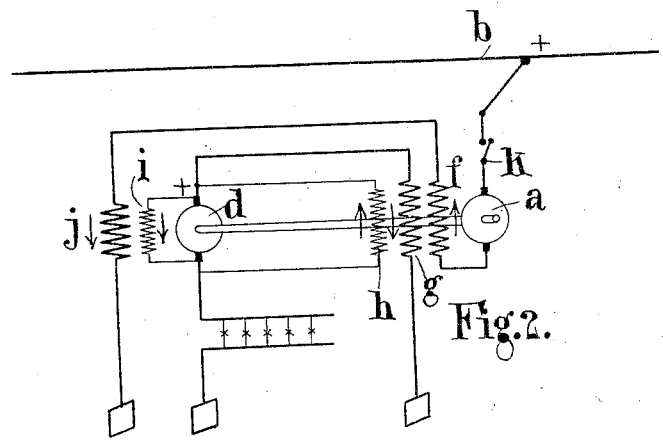

Figure 1 shows a general scheme according to one form of the invention. Fig. 2 shows a modification in which the dynamo is provided with an extra field winding. Fig. 3 shows a form in which both dynamo and motor are combined in one machine.

In the form illustrated in Fig. 1, the motor $a$ to be driven by energy from high tension direct current mains $b$ is mechanically coupled by the shaft $c$ to the dynamo $d$ which supplies energy to low tension mains $e$. The motor $a$ is provided with three field windings $f$, $g$ and $h$, $f$ being fed from the high tension supply as a series winding and $g$ a reverse or negative compound winding from the dynamo $d$. The third winding $h$ is a shunt winding fed from the dynamo $d$ and acts to assist the winding $f$. A suitable shunt exciting winding $i$ is provided for the dynamo $d$.

In operation by means of a switch $k$ high tension current is supplied to the motor $a$ and its field winding $f$. This causes starting of the motor with a high torque, due to the series coils and effects rotation of the dynamo $d$. The winding $h$ now begins to become excited from this dynamo and to assist the winding $f$, first strengthening the series excitation and subsequently outgrowing the same. If power be now taken from the dynamo side it will cause mechanical power to be absorbed from the shaft $c$ from the motor $a$, which in operation will draw more current from the high tension mains and will result in a stronger excitation of the motor field through the winding $f$. This would of itself reduce the speed of the motor, but the action is prevented by means of the reverse winding $g$ carrying the load current of the dynamo, which reduces the excitation of the motor field as the winding $f$ tends to increase it. By suitable design of these three field windings constancy of the dynamo E. M. F. can be obtained.

The form of the invention illustrated in Fig. 2 is similar to that shown in Fig. 1 and a second winding $j$ is provided for the dynamo $d$ in series with the winding $f$ to insure that the dynamo shall excite itself always and prevent racing of the motor $m$. The windings $j$ and $i$ assist one another. In connection with high tension train lighting installation a voltage of about 1500 may be employed which would require thirteen 115 volt lamps in series. By transforming according to the present invention the lamps can all be used in parallel and in this connection it may be noted that the winding $j$ introduces the further advantage that the lamps begin to glow immediately after the closing of the main switch $k$, since the set becomes excited very quickly with this arrangement.

The modification shown in Fig. 3 introduces a combined motor and dynamo with two commutators corresponding to the low tension dynamo and high tension motor respectively. In this case the winding $f$ can replace the windings $f$ and $j$ of Fig. 2 and the winding $h$ can replace the windings $h$ and $i$ of the same figure.

Having now described my invention what I claim as new and desire to secure by Letters Patent is:—

1. In an electric system having high tension mains, a motor fed thereby and a dynamo constructed to generate low tension currents, and having its armature mechanically connected to the armature of the motor, said motor having field coils composed of a series winding of comparatively few turns fed from the high tension mains, an opposing low tension winding in series with the dynamo, and a low tension winding of a comparatively large number of turns in shunt with the dynamo and in assisting relation to the first named winding.

2. In an electric system, a motor and a dynamo having its armature mechanically connected to that of the motor for actuation thereby, said motor having field coils comprising a winding in series with the motor armature, a winding in series with the dynamo and a winding in shunt with the dynamo, the first and second windings being in opposition, and the third winding being in assisting relation to the first winding.

In testimony whereof, I affix my signature in presence of two witnesses.

PAUL AMSLER.

Witnesses:
 CARL GUBLER,
 AUGUST RUEGG.